(12) United States Patent
Artun et al.

(10) Patent No.: US 11,377,746 B2
(45) Date of Patent: Jul. 5, 2022

(54) REAL-TIME CATHODIC PROTECTION INTEGRITY MONITORING SENSOR, SYSTEM AND METHOD

(71) Applicant: Vetco Gray Scandinavia AS, Sandvika (NO)

(72) Inventors: Lars Artun, Sankvika (NO); Mariano Iannuzzi, Sankvika (NO); Marco Rapone, Nailsea (GB)

(73) Assignee: Vetco Gray Scandinavia AS, Sandvika (NO)

( * ) Notice: Subject to any disclaimer, the term of this patent is extended or adjusted under 35 U.S.C. 154(b) by 125 days.

(21) Appl. No.: 16/335,425

(22) PCT Filed: Sep. 19, 2017

(86) PCT No.: PCT/EP2017/073668
§ 371 (c)(1),
(2) Date: Mar. 21, 2019

(87) PCT Pub. No.: WO2018/054915
PCT Pub. Date: Mar. 29, 2018

(65) Prior Publication Data
US 2020/0017977 A1    Jan. 16, 2020

(30) Foreign Application Priority Data
Sep. 22, 2016    (NO) .................................. 20161514

(51) Int. Cl.
*C23F 13/22*    (2006.01)
*C23F 13/04*    (2006.01)
*G01N 17/02*    (2006.01)

(52) U.S. Cl.
CPC .............. *C23F 13/22* (2013.01); *C23F 13/04* (2013.01); *G01N 17/02* (2013.01); *C23F 2213/31* (2013.01)

(58) Field of Classification Search
None
See application file for complete search history.

(56) References Cited

U.S. PATENT DOCUMENTS

| | | | | |
|---|---|---|---|---|
| 2,475,731 A | * | 7/1949 | Weith | C08G 63/553 525/445 |
| 4,090,170 A | * | 5/1978 | Lincklaen-Arriens | G01N 17/02 367/134 |

(Continued)

FOREIGN PATENT DOCUMENTS

GB             2475731 A     *    6/2011             C23F 13/22

*Primary Examiner* — J. Christopher Ball
(74) *Attorney, Agent, or Firm* — Baker Hughes Patent Org.

(57) ABSTRACT

A sensor (4) for monitoring cathodic protection (CP) levels, i.e. cathodic protection potential and current capacity, the sensor being arranged to perform measurements of galvanic current and polarized potential between, on one hand, a reference object and, on the other hand, one of: i) a sacrificial anode (2) and ii) a protected component (1). The sensor comprises a reference electrode (5) in electrical and electrochemical contact with a metal sensing element (6) which has a defined surface area (6') exposed to an electrolyte, the sensing element electrically coupled to one of the sacrificial anode (2) or the protected component (1) via a resistor (15) and a switch (12).

9 Claims, 4 Drawing Sheets

(56) References Cited

U.S. PATENT DOCUMENTS 4,826,577 A * 5/1989 Lange .................... C23F 13/04
204/196.03
2011/0238347 A1* 9/2011 Gemperli ................ C23F 13/04
702/65

* cited by examiner

REAL-TIME CATHODIC PROTECTION INTEGRITY MONITORING SENSOR, SYSTEM AND METHOD

TECHNICAL FIELD OF THE INVENTION

The present invention relates to a sensor for monitoring cathodic protection levels, i.e. cathodic protection potential and current capacity or density, in submerged underwater equipment wherein cathodic protection comprises supply of cathodic current to protected components of the underwater equipment. The invention also relates to implementations in systems and methods for real-time monitoring and control of cathodic protection levels, all based on the novel sensor.

BACKGROUND AND PRIOR ART

In cathodic protection (CP), briefly, corrosion is localized to a replaceable element of lower galvanic potential, which is arranged in galvanic contact with a protected device of higher open circuit potential in the galvanic series. In the subsea environment, seawater is the electrolyte which provides electrochemical contact between the sacrificial element and the protected device. An electrically conductive connection closes the circuit between the sacrificed element, forming the anode, and the protected device which forms the cathode of the galvanic cell.

Replaceable sacrificial anodes are commonly known and used widely in subsea structures, semi-submerged offshore equipment, and the shipping industry.

Beside the replaceable ones, sacrificial anodes can be arranged as layers deposited onto the surface of a protected component. Distributed sacrificial anodes (DSA) can be arranged to cover the entire surface that is exposed to seawater, or concentrated to parts of the protected component to provide both external and internal sacrificial cathodic protection. In the following description of the subject invention, the expression sacrificial anode shall be understood to include both replaceable anodes and the distributed anode layers, such as the DSA embodiments disclosed in applicant's Norwegian patent application no. 20160374 the entirety of which is enclosed herein by reference.

For protection of larger structures submerged into seawater, such as production equipment used in subsea hydrocarbon fields e.g., the sacrificial anodes may not be able to supply enough current for protection. In such cases an external current source may be applied to maintain an optimum current output and required potential between a protected component and the seawater. In these impressed current cathodic protection (ICCP) systems, the current source is typically a DC power source whose negative terminal is connected to the protected component whereas the positive terminal is connected to the anode. The DC power source may be arranged as a transformer and AC/DC converter connected to an AC supply.

In subsea applications, the current supplied to the impressed current system is typically regulated from a topside control arranged on a surface vessel, surface rig or onshore facility.

The effectiveness of a cathodic protection system is primarily dependent on the amount of corrodible sacrificial material that remains in the anode. The status of the cathodic protection system can be monitored by measuring the polarized potential of the protected component. In this context "polarized" potential refers to a change in potential from the open circuit potential of a corroding system. If the potential is changed in the positive (+) direction the system is subject to anodic polarization. If the potential is changed into negative (−) direction the system is in a condition of cathodic polarization Potential measurements are done using a reference electrode of well-known electrode potential. A frequently used reference electrode is the silver chloride (Ag/AgCl) electrode. According to recent standards (DNV-RP-B401), effective cathodic protection of subsea components requires a potential of −0.8 V versus the Ag/AgCl electrode in seawater.

U.S. Pat. No. 8,154,296 B2 discloses a method and system arranged to enable remote condition monitoring and diagnostics of cathodic protection potential in submerged equipment, without the need for subsea intervention by ROV (remotely operated vehicle) as conventionally required. First and second electrodes are pairwise employed to measure the polarized potential of a protected item in seawater: the first electrode is electrically connected to the item that receives cathodic protection, whereas the second electrode is arranged in contact with the water proximate to the item. The measured potential is fed to a transducer which converts the potential to a signal that is compatible with the communication protocol employed by a subsea processing means. The signal is transmitted to a topside facility or master control station (MCS) via the subsea electronic module (SEM) for further processing and, if required, for regulation of the cathodic current from the MCS.

SUMMARY OF THE INVENTION

It is a general object of the present invention to provide an alternative to existent systems and methods for monitoring the status of cathodic protection in underwater equipment.

It is a further object of the present invention to provide a system and method for monitoring of cathodic protection levels and control of supplied cathodic current to components of the underwater equipment.

It is still a further object of the present invention to provide a distributed system suitable for real-time monitoring and control of cathodic protection in underwater equipment.

It is an object of the present invention to provide a sensor arranged for monitoring of cathodic protection potential and current capacity in a cathodic protection system.

It is another object of the present invention to provide a sensor suitable for distribution within the process control system of a subsea production process.

At least one of these objects is met in a sensor being arranged to perform measurements of galvanic current and polarized potential between, on one hand, a reference object and, on the other hand, one of: i) a sacrificial anode and ii) a protected component, wherein the sensor comprises a reference electrode in electrical and electrochemical contact with a metal sensing element which has a defined surface area exposed to an electrolyte, such as water, the sensing element electrically coupled to one of the sacrificial anode or the protected component via a resistor and a switch.

In a preferred and advantageous embodiment, the sensor is an integral structure comprising the reference electrode and the sensing element embedded in a body of non-conductive material, which may also be pressure resistant to withstand static pressure at great sea depths. The embedding material can be a thermosetting polyester such as epoxy, polyoxybenzylmethylenglycolanhydride (Bakelite), or other polymer or non-conductive ceramic. A durable outer shell can be arranged to protect the body from external impact. The reference electrode can be arranged in the form of a rod or wire extending through the centre of a sensing element shaped as a ring or a tube. The reference electrode and the sensing element are mounted flush with the body of embedding material and are both exposed to the electrolyte. The reference electrode may be a silver (Ag) wire with a silver chloride (AgCl) surface layer, a zinc (Zn), platinum (Pt) or indium (In) wire, or a copper (Cu) wire with a copper sulphate (CuSO4) layer.

An input terminal on the sensor provides electrically conductive connection between the sensing element and the protected component (or the sacrificial anode if appropriate), the connection setting the two at the same voltage potential relative to the electrolyte. The current is conducted via a resistor and an ON/OFF switch. Internal wiring in the integral body communicates polarized potentials to an output terminal from, on one hand, the sensing element and the reference electrode, and, on the other hand, from either side of the resistor included in the input connection. The resistance of the resistor may be in the range of 1-100 Ohm.

An output terminal on the sensor is thus arranged to deliver a first output voltage (V1) indicative of the polarized potential between the sensing element and the reference electrode, and a second output voltage (V2) which is indicative of the galvanic current flowing to the sensing element from one of the sacrificial anode or the protected component.

The cathodic current and potential required to protect the component can, then, be determined in calculations based on the sensor values of galvanic current and potential between the sensing surface, i.e. the end plane of the tube, of known area, and the protected component or the anode. This, in turn, reflects the status of the sacrificial anode or anode layer.

The sensing element is made of a corrosion resistant alloy (CRA) and, thus, is resistant to corrosion in seawater environments, preferably one of palladium (Pd), platinum (Pt), gold (Au), silver (Ag), titanium (Ti), Cu-based alloys, or stainless steel with a pitting resistance equivalent (PRE) above 40. The choice of CRA ensures long service life for the sensing element, and allows for real-time monitoring using a distributed network of permanently installed sensors.

The exposed area of the sensing element may range from about 1 to 15 cm2 in size, rendering the entire sensor a modest overall size that requires only a minimum of installation space, and offers great freedom of choice in location of sensors on the subsea components.

In order to prevent deposits (such as calcareous deposits, e.g.) on the exposed area of the sensing element that could alter the current and potential response of the sensor, the switch in the conductive connection to the sensing element is controlled between on and off positions; cycling the potential and current supply to the sensing element. The sensing element can also be coated to prevent above-said deposits.

The sensor, substantially as heretofore described, offers a key to a system for real-time monitoring of cathodic protection levels through a network of sensors, permanently installed and distributed within the submerged equipment.

The high resolution diagnosis of the cathodic protection and anode status provided by the distributed network of real-time delivering sensors is a prerequisite for a differentiated control of cathodic current to individual components of the underwater equipment, as will be explained below.

More particularly, in order to meet at least one of the objects stated above, the present invention discloses a system for real-time monitoring and differentiated control of cathodic protection (CP) levels, i.e. cathodic protection potential and current capacity, in underwater equipment the operation of which is controlled via a subsea production control system (PCS), wherein cathodic protection comprises means for supplying cathodic current to protected components of the underwater equipment, the system comprising:

a distributed network of sensors installed on the underwater equipment, the sensors arranged to perform measurements of galvanic current and polarized potential between, on one hand, a reference object and, on the other hand, one of: i) a sacrificial anode and ii) a protected component of the underwater equipment;

a subsea, electronic, cathodic protection control unit (CPC) comprising a plurality of input terminals and a processor configured to receive and individually process sensor signals indicative of changes in the cathodic protection levels, wherein the CPC unit uses the PCS for communication, wherein the CPC unit is in communicative contact with the cathodic current supply means and configured to initiate discrete current control commands for regulating the cathodic current supplied to individual components or component groups of the underwater equipment in response to detected cathodic protection levels.

This system provides several benefits such as: no ROV intervention required
current and potential spatial mapping
early warning
integration with other Internet of Things sensors and software interfaces
power consumption adapted to detected needs
controlled anode corrosion
self-powered sensors (driven by the supplied cathodic current)
cables and wiring shared with the PCS
fast response possible through automatic regulation of the cathodic current supply. The system as outlined above offers great possibilities of integration with the PCS. In a preferred implementation, the system integration foresees that the sensors communicate with the CPC unit via a conventional distributed cable network of the PCS.

Integration advantageously foresees, that the CPC unit is subordinated the subsea electronic module SEM, self a part of the PCS and in communicative contact with the topside master control via an umbilical.

Signal processing in the CPC unit may include an initial step of pre-conditioning and amplification before the signals are transferred to a multichannel analogue-to-digital converter. The converted signals are treated in a microprocessor which makes iterations following a programmed instruction, and converts the results into a format that is suitable for transmitting on the SEM data bus, via a transceiver in the CPC unit.

Integration with the PCS as disclosed offers the possibility of making CP diagnosis in parallel based on measurements from a large number of distributed sensors. For example, the sensors may be arranged in groups of say ten sensors, wherein the sensors of the same group share a signal path in the CPC via a node which is also a switch that selects sequentially among the sensors of this group. The CPC processor can be dimensioned for processing ten sensor signals in parallel, one selected from each group of ten sensors in a set of ten groups. In this embodiment, the measurements from a total of one hundred sensors may be sequentially treated in a continuous process.

The result from signal processing in the CPC can be communicated to the topside master control for further processing. The further processing typically includes generation of current control commands for regulation of supplied cathodic current in response to detected cathodic protection levels.

Current control commands, when generated in the CPC unit, may alternatively be communicated directly to the cathodic current supply means, without being routed via the topside master control. In both cases, the current control commands are initiated from the CPC, based on the signal processing done in the CPC microprocessor. In a preferred embodiment of the system, the current supply means is an AC powered transformer-rectifier unit located subsea, coupled to the subsea components via a set of microcontroller switches to deliver direct current selectively to the subsea components.

The sensors are advantageously powered by the cathodic current supplied to the CP system.

The system substantially as heretofore described, based on use of a sensor substantially according to the above description, permits the implementation of a method for real-time monitoring and differentiated control of cathodic protection (CP) levels, i.e. cathodic protection potential and current capacity, in underwater equipment the operation of which is controlled via a subsea PCS, wherein cathodic protection comprises means for supplying cathodic current to protected components of the underwater equipment, the method comprising:

arranging a distributed sensor network configured for generation of voltage outputs indicative of changes in galvanic current and polarized potential between, on one hand, a reference object and, on the other hand, one of: i) a sacrificial anode and ii) a protected component of the underwater equipment, communicating the sensor outputs via the PCS to a cathodic protection control unit (CPC), and generating in the CPC unit discrete current control commands for regulating the cathodic current supplied to individual components or component groups of the underwater equipment in response to detected CP levels.

Embodiments of the method may include some or several of the following additional features: operating the sensors on power supplied by the cathodic current supply means; cycling the supply of current to the sensors to prevent deposits on the sensing area; regulating the cathodic protection levels individually for protected components of the underwater equipment via a topside operator or optionally from the CPC unit directly without involvement from the topside operator; determining the status of the cathodic protection (CP) by comparing detected changes in galvanic current and polarized potential with the corresponding levels of a cathodic protection system in balance, wherein deviations from the levels of the balanced system are ranked in categories of adequate CP, suboptimal CP and inadequate CP.

SHORT DESCRIPTION OF THE DRAWINGS

Embodiments of the invention will be described below with references made to the accompanying drawings. In the drawings.

DETAILED DESCRIPTION OF PREFERRED EMBODIMENTS

Embodiments of the invention are illustrated schematically in the drawings.

Figure 1:
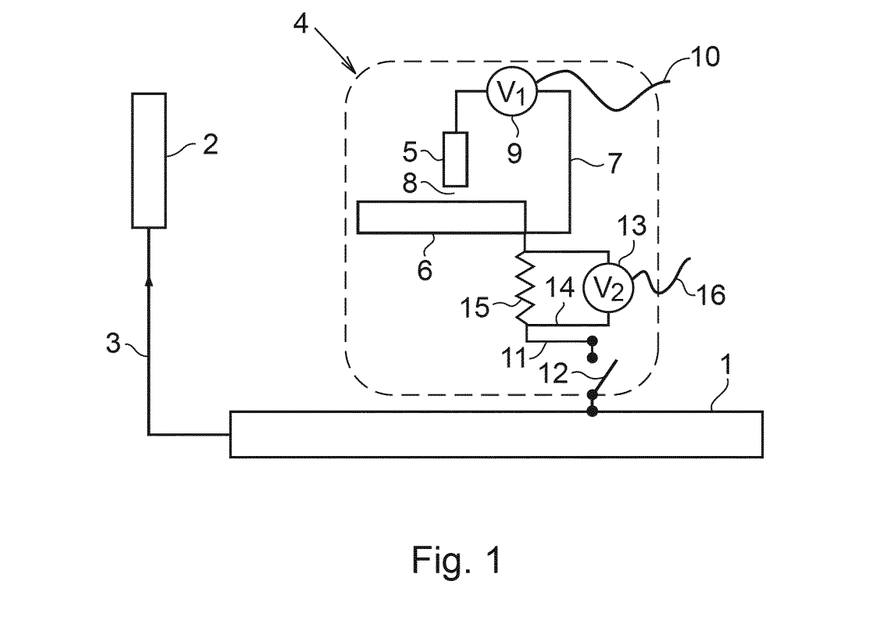
FIG. 1 is a diagram showing the setup of a sensor in a cathodic protection (CP) monitoring system.

With reference to FIG. 1, a component 1 to be protected is electrically connected to a sacrificial anode 2 via a connection 3. The sacrificial anode 2 and the subsea component 1 constitute the anode and the cathode respectively of a cathodic protection system.

A sensor 4 comprises a reference electrode 5 and a sensing element 6. The reference electrode 5 and the sensing element 6 are in electric contact via a wire 7. When in use the reference electrode 5 and the sensing element 6 are submerged in water or other form of electrolyte, the reference electrode 5 and the sensing element 6 are thus also in electrochemical contact as schematically symbolized by reference number 8.

A first voltmeter 9 is arranged to detect the polarized potential between the reference electrode 5 and the sensing element 6. The output from the first voltmeter 9 is transmitted to an output terminal 10 on the sensor.

The sensing element 6 is electrically connected to the protected component 1 via a connection 11. An ON/OFF switch 12 is arranged in this connection 11 for closing and opening, i.e. for feeding and non-feeding electrical current from the component 1 to the sensing element 6. A second voltmeter 13 is arranged on a wire loop 14 which connects to the electrical connection 11 on either side of a 1-100 Ohm resistor 15. The output from the second voltmeter 13 is transmitted to an output terminal 16 on the sensor.

Figure 2:
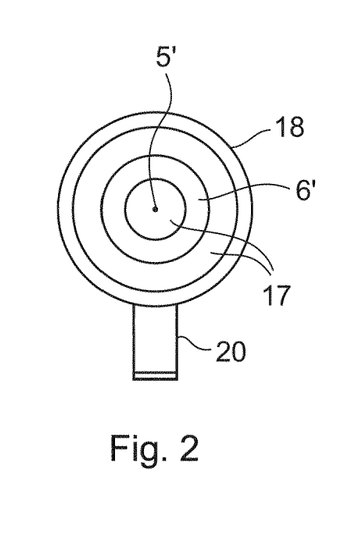
FIG. 2 is an end view of the sensor.
Figure 3:
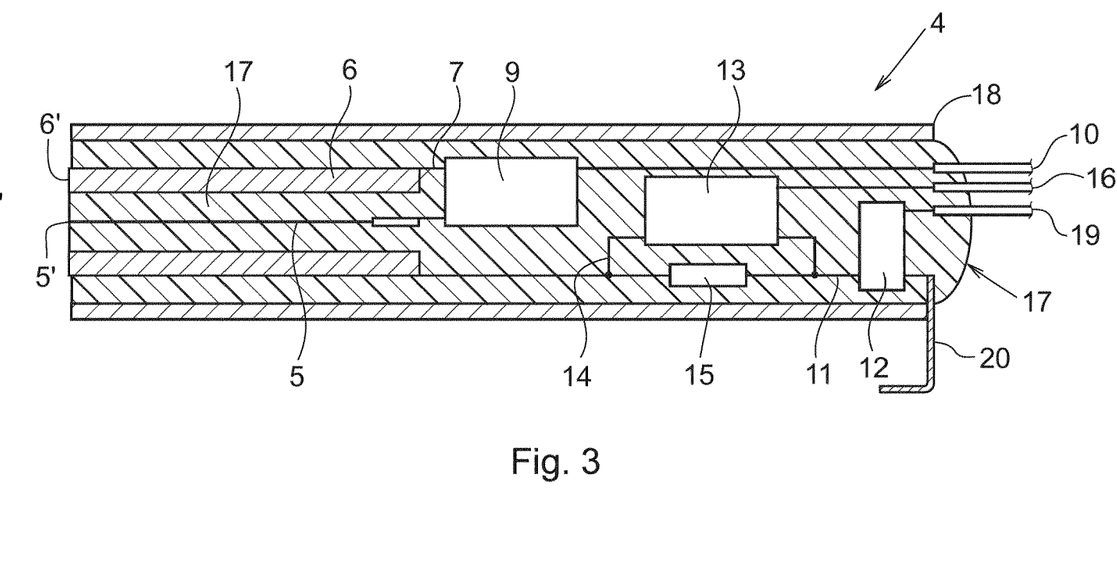
FIG. 3 is a longitudinal section through the sensor of FIG. 2.

One embodiment of the sensor 4 is illustrated schematically in FIGS. 2 and 3. The embodiment of FIGS. 2 and 3 is arranged as an integral unit. More precisely, the elements of the sensor, including the reference electrode 5, the sensing element 6, the first and second voltmeters 9 and 13, the resistor 15, the switch 12 and associated wiring are embedded in a body 17 of non-conductive and pressure-resistant material. The body 17 may be inserted and protected inside an external shell 18 made of non-corrosive and durable material. In this embodiment the reference electrode 5 is a wire which extends through the central region of a sensing element 6 in the form of a tube. The ends 5' and 6' of the reference electrode 5 and of the sensing element 6 respectively are uncovered an exposed to the electrolyte (such as water) in one end of the sensor (the bare ends 5', 6' are visible in FIG. 2). The output terminals 10 and 16, as well as a control input 19 to the switch 12, project from the other end of the sensor. A contact plate 20 is arranged to feed cathodic current to the switch 12 when the sensor is mounted to a subsea component included in the cathodic protection system.

Figure 4:
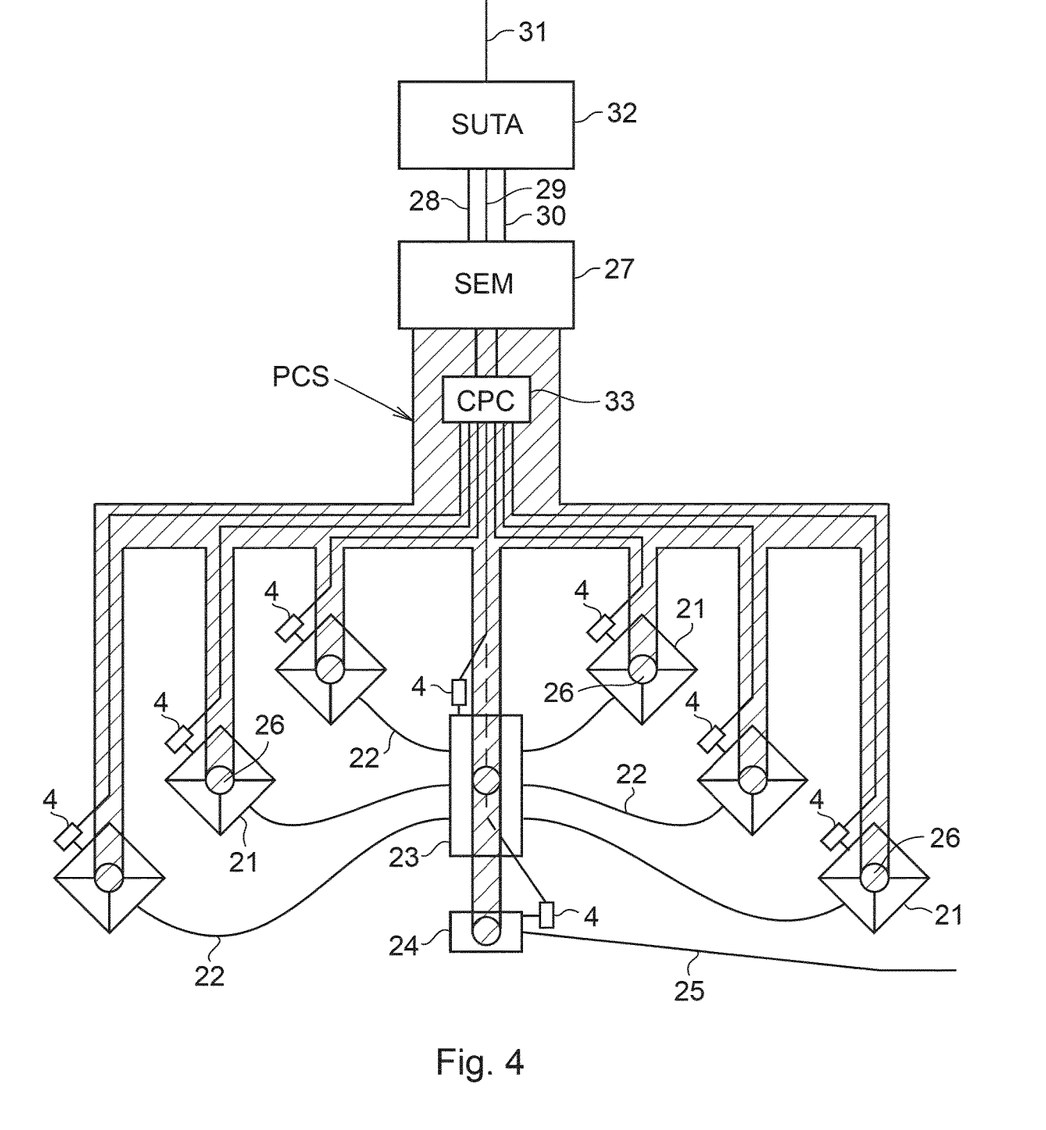
FIG. 4 is an overview of an integrated CP monitoring system.

Integration of the sensor 4 in a production control system, PCS, for a subsea hydrocarbon production plant is illustrated schematically in FIG. 4. The hydrocarbon production plant comprises a number of wells 21, jumpers 22 connecting the wells to a manifold 23, a pipeline end termination assembly 24 and a pipeline 25 for transport of hydrocarbon fluid recovered from the wells. The flows of production fluid, injection water or chemicals are controlled and regulated by means of valves on wellheads and valve trees, on manifolds and on pipeline termination assemblies. Regulation of these flows is governed through subsea control modules (SCM) 26 which are distributed to the operational components of the hydrocarbon production plant. The SCM 26 can be seen as the executive means of the PCS system, the SCM controlling the administration of electrical power, signals and hydraulic power that is distributed within cables, hoses and wiring of the PCS system. In FIG. 4, the widespread character of the PCS system is illustrated symbolically by the section-marked tree structure. At the root end of this tree, a subsea electronics module (SEM) 27 is arranged to control, within the PCS system, the flows of electrical power 28, control power 29 and hydraulic fluid 30 which are received via an umbilical 31 and the subsea umbilical termination assembly (SUTA) 32.

In a system aspect of the present invention, a distributed network of sensors 4 can be permanently installed on components to be protected in a hydrocarbon production plant. The sensors are connected to a cathodic protection control (CPC) unit 33 for upstream communication of measured values and for downstream communication of switch control signals. The CPC unit 33 is subordinated the SEM 27 for topside communication via the umbilical. Although illustrated as a separate module, the CPC unit may alternatively be integrated as part of the SEM 27.

Figure 5:
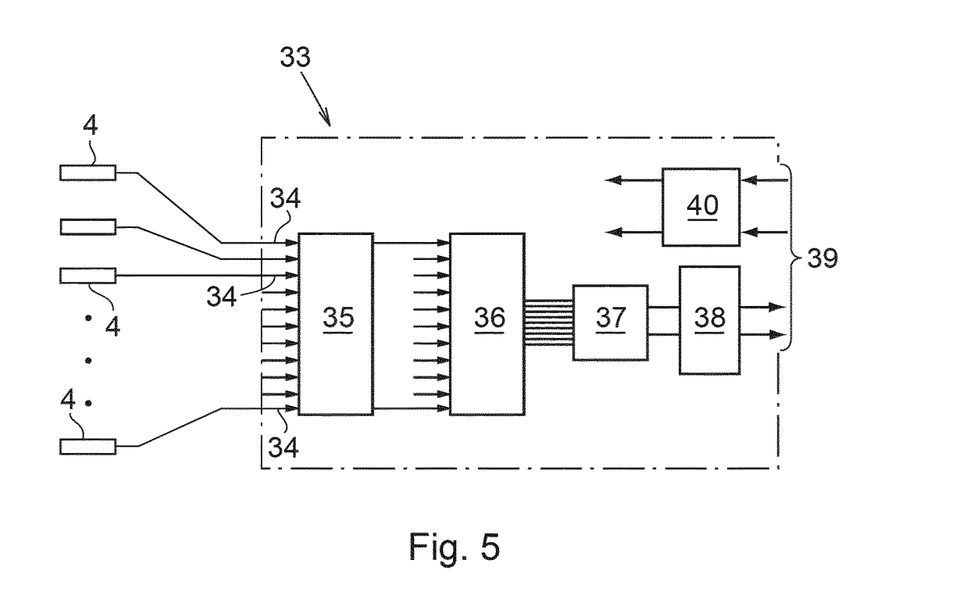
FIG. 5 is a diagram showing an interface between CP monitoring and production control (PCS) systems.

With reference to FIG. 5, the CPC unit 33 comprises a plurality of input terminals 34 arranged to receive inputs from the corresponding number of sensors 4. The sensor signals may be introduced via an amplifier circuit 35 and an analogue-to-digital converter 36, from where the signals are fed to a micro-processor 37 for treatment. The outputs from the micro-processor are fed to a transceiver 38 which provides two-way communication with the SEM module via a multiple wire interface 39. An IC (integrated circuit) power supply 40 feeds DC current to the IC modules of the CPC unit.

Figure 6:
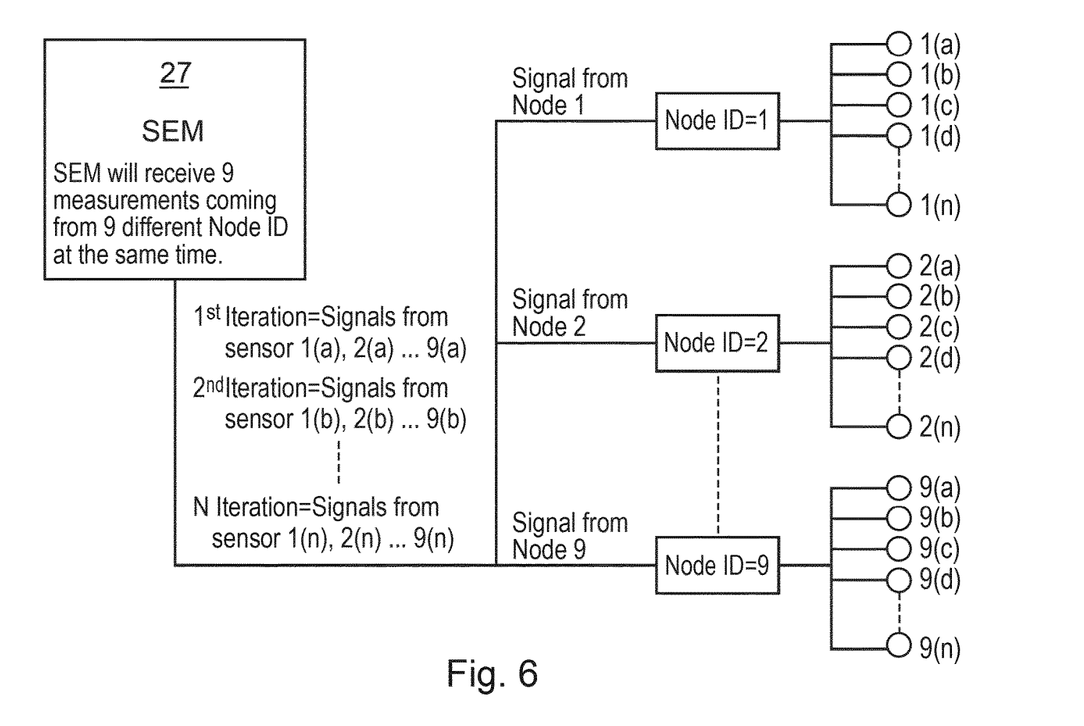
FIG. 6 is a diagram illustrating the tree structure of signal pathways in a CP monitoring system which is subordinated the subsea electronic module (SEM) of a PCS system.

In one embodiment, the micro-processor 37 has the processing capacity and program codes required to evaluate the status of the cathodic protection, based on the inputs from the sensors. The micro-processor 37 may additionally be configured to generate current control commands for regulation of the cathodic current to be supplied to the subsea components. In another embodiment, evaluation of the status of the cathodic protection is performed in the SEM module 27, whereas the micro-processor 37 operates as a switch bank to feed sensor data sequentially to the SEM module. This embodiment is illustrated in the diagram of FIG. 6. A plurality of sensors a-n are assigned to individual addresses under respective address nodes 1 to 9 on a superior level. The micro-processor 37 is configured to transfer sequentially the data from the nodes 1-9 to the SEM for computation, such that the 1st iteration involves data from sensors 1(*a*), 2(*a*) etc. to 9(*a*), the 2nd iteration involves data from sensors 1(*b*), 2(*b*) etc. to 9(*b*), until completing the nth iteration involving data from sensors 1(*n*) to 9(*n*).

From the disclosure, it will be appreciated that the present invention avoids the main disadvantages of currently practised solutions, which are typically ROV operated, are limited to spot measuring, and which do not provide real-time monitoring nor allow for spatial potential and current mapping.

In contrast, the present invention proposes an integrated sensor network that will monitor the health of the CP system in real time. The monitoring system can be integrated in the subsea production control system for data logging, risk assessment, and for actioning from surface equipment or automatically without intervention from the operator.

The sensor network will rank the health of the CP system by monitoring current and potential vs. time. The monitoring device is based on measurement of the galvanic current and potential (i.e. the polarization of the structure) between a sensing surface of known exposed area and either i) a sacrificial anode or ii) a subsea component connected to the CP system.

By way of integration with the PCS system and SEM electronics as disclosed, a plurality of sensors can be employed to provide a CP status monitoring system and method with high resolution.

The invention claimed is:

1. A system for real-time monitoring and control of cathodic protection (CP) levels including cathodic protection potential and current capacity, in underwater equipment the operation of which is controlled via a subsea production control system (PCS), wherein cathodic protection comprises a supplier configured to provide cathodic current to protected components of the underwater equipment, the system comprising:

a distributed network of sensors installed on the underwater equipment, the sensors arranged to perform measurements of galvanic current and polarized potential between (i) a reference object and (ii) a sacrificial anode or a protected component of the underwater equipment;

a subsea, electronic, cathodic protection control (CPC) unit comprising a plurality of input terminals and a processor configured to receive and individually process sensor signals indicative of changes in the CP levels, wherein the CPC unit uses the PCS for communication, wherein the CPC unit is in communicative contact with the cathodic current supplier and configured to initiate current control commands for regulating the cathodic current supplied to individual components or component groups of the underwater equipment in response to detected CP levels, and the sensors are powered by cathodic current supplied to the CP system.

2. The system of claim 1, wherein the CPC unit is integrated in a subsea electronic module (SEM) of the PCS.

3. The system of claim 1, wherein the plurality of sensors are connected to the CPC unit via a distributed network of the PCS.

4. A method for real-time monitoring and control of cathodic protection (CP) levels including cathodic protection potential and current capacity, in underwater equipment the operation of which is controlled via a subsea production control system (PCS), wherein cathodic protection comprises a supplier configured to provide cathodic current to protected components of the underwater equipment, the method comprising:

arranging a distributed network of sensors configured for generation of voltage outputs indicative of changes in galvanic current and polarized potential between (i) a reference object and (ii) a sacrificial anode or a protected component of the underwater equipment;

communicating the sensor outputs via the PCS to a cathodic protection control (CPC) unit;

generating in the CPC unit current control commands for regulating the cathodic current supplied to individual components or component groups of the underwater equipment in response to detected CP levels;

arranging each sensor with a reference electrode in electrical and electrochemical contact with a metal sensing element which has a defined area exposed to the water; and configuring the sensor to generate a first output voltage indicative of the polarized potential between the metal sensing element and the reference electrode, and a second output voltage (V2) indicative of the galvanic current flowing to the metal sensing element from one of the sacrificial anode or the protected component.

5. The method of claim 4, further comprising
coupling the sensing element electrically to one of the sacrificial anode or the protected component via a resistor and a switch.

6. The method of claim 4, further comprising cycling the supply of current to the sensors to prevent deposits on the sensing area.

7. A method for real-time monitoring and control of cathodic protection (CP) levels including cathodic protection potential and current capacity, in underwater equipment the operation of which is controlled via a subsea production control system (PCS), wherein cathodic protection comprises a supplier configured to provide cathodic current to protected components of the underwater equipment, the method comprising:
arranging a distributed network of sensors configured for generation of voltage outputs indicative of changes in galvanic current and polarized potential between (i) a reference object and (ii) a sacrificial anode or a protected component of the underwater equipment;
communicating the sensor outputs via the PCS to a cathodic protection control (CPC) unit;
generating in the CPC unit current control commands for regulating the cathodic current supplied to individual components or component groups of the underwater equipment in response to detected CP levels; and
operating the sensors on cathodic current supplied by the cathodic current supplier.

8. The method of claim 7, further comprising regulating the CP levels individually for protected components of the underwater equipment via a topside operator or optionally from the CPC unit directly without involvement from the topside operator.

9. A method for real-time monitoring and control of cathodic protection (CP) levels including cathodic protection potential and current capacity, in underwater equipment the operation of which is controlled via a subsea production control system (PCS), wherein cathodic protection comprises a supplier configured to provide cathodic current to protected components of the underwater equipment, the method comprising:
arranging a distributed network of sensors configured for generation of voltage outputs indicative of changes in galvanic current and polarized potential between (i) a reference object and (ii) a sacrificial anode or a protected component of the underwater equipment;
communicating the sensor outputs via the PCS to a cathodic protection control (CPC) unit;
generating in the CPC unit current control commands for regulating the cathodic current supplied to individual components or component groups of the underwater equipment in response to detected CP levels; and
determining the status of the cathodic protection (CP) by comparing detected changes in galvanic current and polarized potential with the corresponding levels of a cathodic protection system in balance, wherein deviations from the levels of the balanced system are ranked in categories of adequate CP, suboptimal CP and inadequate CP.

* * * * *